United States Patent [19]
Chandley et al.

[11] Patent Number: 6,004,368
[45] Date of Patent: Dec. 21, 1999

[54] MELTING OF REACTIVE METALLIC MATERIALS

[75] Inventors: George D. Chandley, Amherst; Ronald E. Erickson, Milford; Paul J. Tousignant, Manchester, all of N.H.

[73] Assignee: Hitchiner Manufacturing Co., Inc., Milford, N.H.

[21] Appl. No.: 09/020,455

[22] Filed: Feb. 9, 1998

[51] Int. Cl.[6] .............................. C22C 14/00; C22C 1/02
[52] U.S. Cl. .................... 75/10.14; 75/10.18; 75/612; 420/418; 420/590
[58] Field of Search ................. 75/10.18, 10.14, 75/612; 420/590, 418, 419, 420

[56] References Cited

U.S. PATENT DOCUMENTS

| | | | |
|---|---|---|---|
| 3,682,458 | 8/1972 | Piwonka et al. | 266/33 |
| 3,998,264 | 12/1976 | Hocking | 164/251 |
| 4,265,843 | 5/1981 | Dias et al. | 264/57 |
| 4,585,474 | 4/1986 | Andorfer | 75/10.18 |
| 4,718,940 | 1/1988 | McPhillips | 75/10.18 |
| 4,738,713 | 4/1988 | Stickle et al. | 75/10.18 |
| 5,033,948 | 7/1991 | El-Kaddah et al. | 425/8 |
| 5,042,561 | 8/1991 | Chandley | 164/63 |
| 5,299,619 | 4/1994 | Chandley et al. | 164/53 |
| 5,690,891 | 11/1997 | Choudhury et al. | 420/418 |

FOREIGN PATENT DOCUMENTS

| | | |
|---|---|---|
| 0 409 794 A1 | 7/1990 | European Pat. Off. . |
| 0 426 350 A2 | 10/1990 | European Pat. Off. . |

*Primary Examiner*—Prince Willis
*Assistant Examiner*—Tima McGuthry-Banks
*Attorney, Agent, or Firm*—Edward J. Timmer

[57] ABSTRACT

Method and apparatus for melting reactive metallic materials, such as for example titanium base alloys and other reactive alloys, by selective and sequential induction heating of a plurality of solid alloy charge components segregated in a refractory melting vessel in a manner to effect rapid top-to-bottom melting that avoids harmful reaction of the melt with refractory melting vessel material and contamination of the melt.

18 Claims, 2 Drawing Sheets ated to an unacceptable extent. As a result, it common to melt such alloys in water cooled, metal (e.g. copper) crucibles using electric arc or induction to generate heat in the alloy charge for melting. U.S. Pat. Nos. 4,738,713 and 5,033,948 are representative of such melting techniques.
6,004,368

MELTING OF REACTIVE METALLIC MATERIALS

FIELD OF THE INVENTION

The present invention relates to method and apparatus for melting reactive alloys in high volumes at reduced cost without harmful contamination resulting from reactions between the reactive melt and melt containment materials.

BACKGROUND OF THE INVENTION

Many alloys with high weight percentages of a reactive metal, such as titanium, react with air and most common crucible refractories to the degree that the alloy is contaminated to an unacceptable extent. As a result, it common to melt such alloys in water cooled, metal (e.g. copper) crucibles using electric arc or induction to generate heat in the alloy charge for melting. U.S. Pat. Nos. 4,738,713 and 5,033,948 are representative of such melting techniques.

Alloys of titanium and aluminum forming intermetallic compounds, such as TiAl, have received considerable attention in recent years for use in the aerospace and automobile industries in service applications where their high strength at elevated temperature and relatively light weight are highly desireable. However, the intermetallic alloys contain a majority of titanium (e.g. so-called gamma TiAl includes 66 weight % Ti with the balance essentially Al) which makes melting and casting without contamination difficult and costly.

The Chandley and Flemings U.S. Pat. No. 5,299,619 describes an improved melting and casting technique for reactive metals and alloys, including those forming intermetallic compounds, wherein heating and melting of a charge of solid titanium in a ceramic crucible is accelerated by a robust exothermic reaction with a molten aluminum charge component that is separately melted and then introduced to the crucible to contact the titanium charge component. Reduced residence time of the melted charge components reduces potential contamination of the melt by reaction with the crucible materials.

Unfortunately, titanium based alloys, such Ti-6Al-4V, have insufficent aluminum present in the alloy composition to effect the robust exothermic reaction with titanium in the melting vessel for practicing the rapid melting, reduced contamination technique of U.S. Pat. No. 5,299,619. Since such "aluminum poor" titanium based alloys are in widespread use, there is a need for a melting method that can provide low cost, rapid melting of such "aluminum poor" reactive alloys with reduced contamination of the melt.

It is an object of the present invention to provide method and apparatus that satisfy the aforementioned need for a melting method and apparatus that can provide low cost, rapid melting, reduced contamination of "aluminum poor" titanium base alloys as well as other reactive alloys having compositions incapable of a robust exothermic reaction in a melting vessel.

It is another object of the present invention to provide method and apparatus for melting reactive metallic materials in a refractory melting vessel using selective and sequential induction heating of various solid metallic charge components segregated in a refractory crucible in a manner to effect top-to-bottom melting of the components that avoids harmful contamination of the melt.

It is another object of the present invention to provide method and apparatus useful for melting reactive metallic materials in a refractory melting vessel in top-to-bottom manner that eliminates the need for a separate melting step of one charge component that heretofore was melted first and then added to the vessel.

SUMMARY OF THE INVENTION

The present invention provides method and apparatus useful for melting reactive metallic materials by selective and sequential induction heating of a plurality of solid alloy charge components segregated in a refractory melting vessel in a manner to effect rapid top-to-bottom melting that avoids harmful reaction of the melt with refractory melting vessel material and contamination of the melt. The present invention can be practiced to melt reactive metallic materials such as "aluminum poor" titanium base alloys as well as other reactive alloys, such as zirconium base and iron base alloys, having compositions incapable of robust exothermic reaction in a melting vessel. In addition, the present invention can be practiced to melt reactive metallic materials, such as TiAl and other intermetallic compound-forming alloys, that have compositions capable of robust exothermic reaction without the need for a separate melting step of one charge component.

In an illustrative embodiment of the present invention, the higher melting point alloying element(s) of a reactive alloy is/are positioned as solid charge component(s) in an underlying position, such as in a lower region, of a refractory melting vessel and the relatively lower melting point alloying element(s) is/are positioned as solid charge component (s) in an overlying position such as above the higher melting point charge component(s) in the vessel. For example only, to form a Ti-6Al-4V reactive melt, relatively high melting point solid titanium and vanadium charge components are dispersed together proximate the bottom of the melting vessel underneath a lower melting point solid charge component comprising at least partially aluminum along with optional lower and/or higher metal point metals. Then, the upper portion of the charge is selectively induction heated in the melting vessel to increase its temperature above that of the lower portion of the charge. Thereafter, both the upper and lower portions of the charge are induction heated at higher power input to rapidly melt the upper portion of the charge followed by melting of the lower portion charge to form a molten alloy in very short melting time, such as for example only 1 to 3 minutes, to reduce residence time of the melt in the refractory melting vessel. In particular, the upper portion of the charge exhibits a higher resisitivty as a result of being preheated to a higher temperature and thus generates more heat upon induction heating at the higher power input. The lower melting point charge component melts first, alloys with the upper portion of the charge, and flows toward the bottom of the melting vessel as a result.

As top-to-bottom melting of the charge components occurs, the molten alloy is substantially held away from the side walls of the melting vessel by the high induction coil power input so as to reduce adverse reaction between the molten alloy and the vessel refractory material. Moreover, the bottom center of the higher melting point charge component(s) is the last region of the charge to melt and reduces adverse reaction of the molten alloy with the refractory material at the bottom of the melting vessel.

The molten alloy can be cast from the melting vessel using conventional countergravity or gravity casting techniques as soon as the melt is at an appropriate casting temperature to also reduce residence time and melt contamination.

The present invention is advantageous in that a wide variety of reactive alloys can be rapidly melted with reduced contamination, including myriad reactive alloys having compositions incapable of robust exothermic reaction in a melting vessel. Morever, there is no need for a separate melting step to separately melt one charge component that then must be added to the melting vessel, thereby simplifying and reducing the cost of melting and casting reactive alloys. In addition, use of selective and sequential induction heating of a plurality of solid alloy charge components segregated in a refractory melting vessel in a manner to effect rapid top-to-bottom melting permits use of conventional crucible refractory materials in the melting of reactive alloys, while still reducing harmful contamination of the reactive alloy melt.

These and other advantages and objects of the present invention will be better understood from the following detailed description of the invention taken with the following drawings.

DESCRIPTION OF THE INVENTION

The present invention provides method and apparatus for rapidly melting a wide variety of reactive metallic materials, such as for example only titanium base alloys, zirconium base alloys, and iron base alloys, having compositions unsuitable for practicing the rapid melting, reduced contamination technique of U.S. Pat. No. 5,299,619 as well as reactive alloys, such as TiAl and other intermetallic compound-forming alloys, that do have compositions suitable for practicing the patented rapid melting technique. Importantly, the latter reactive alloys can be melted pursuant to the present invention without the need for the separate melting step.

Binary, ternary, quaternary, and other higher reactive alloys can be melted by practice of the present invention. An exemplary binary alloy comprises a titanium and aluminum alloy that includes 66 weight % Ti and balance essentially Al and that forms the well known predominantly gamma TiAl intermetallic compound. This reactive alloy can be melted pursuant to the invention without the need for separately melting of the aluminum alloy component. An exemplary ternary alloy can include an alloy of titanium, aluminum and another metal, such as the well known Ti-6Al-4V alloy where the numbers represent weight %'s of the alloying elements. The Ti-6Al-4V alloy has insufficient aluminum to effect the robust exothermic reaction with titanium as described in U.S. Pat. No. 5,299,619. Representative reactive alloys that can be melted pursuant to the present invention are described in the Examples set forth below for purposes of illustration only and not limitation.

Figure 1:
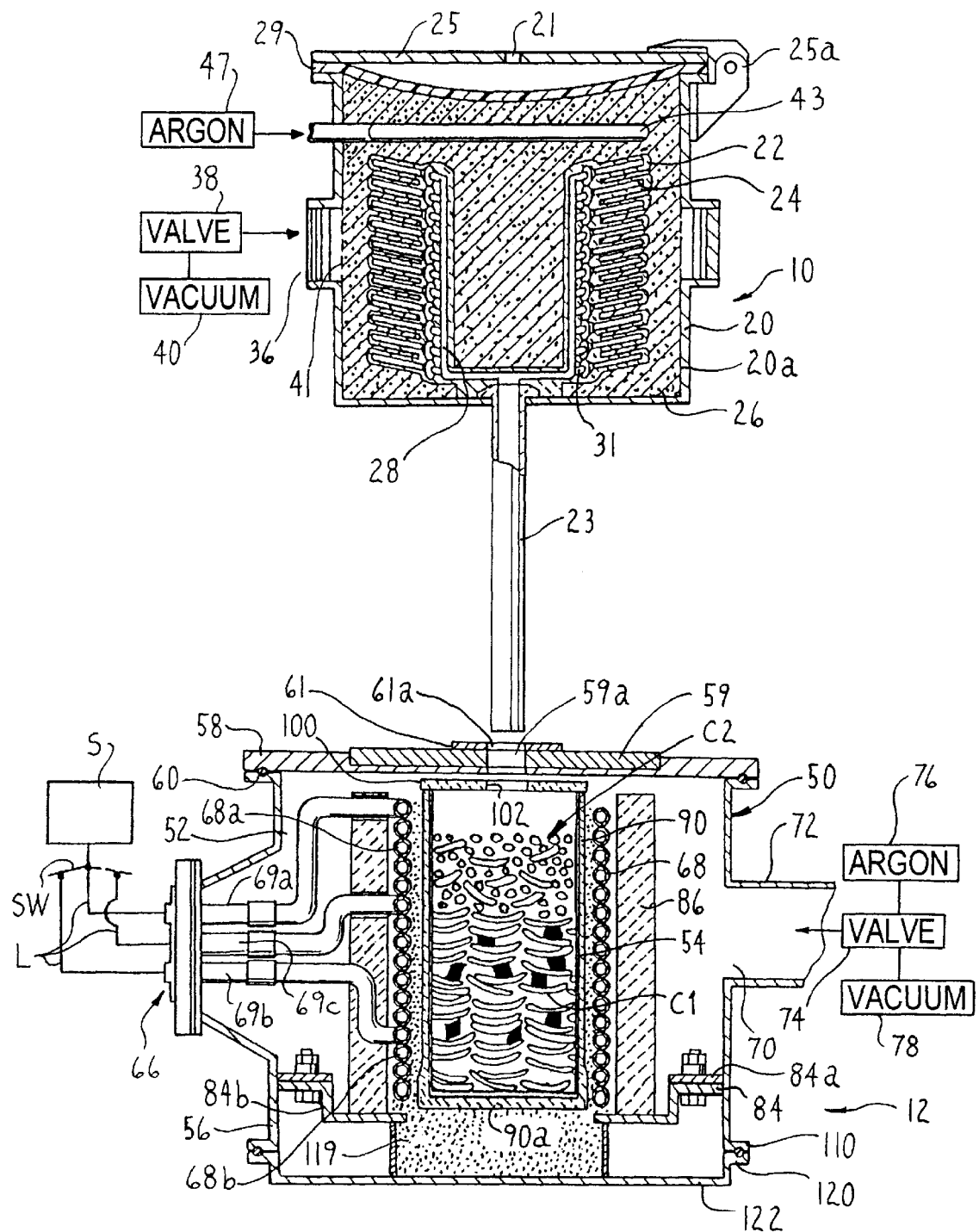
FIG. 1 is a schematic, sectioned side view of apparatus in accordance with an embodiment of the invention for melting and countergravity casting of a reactive alloy melt.
Figure 2:
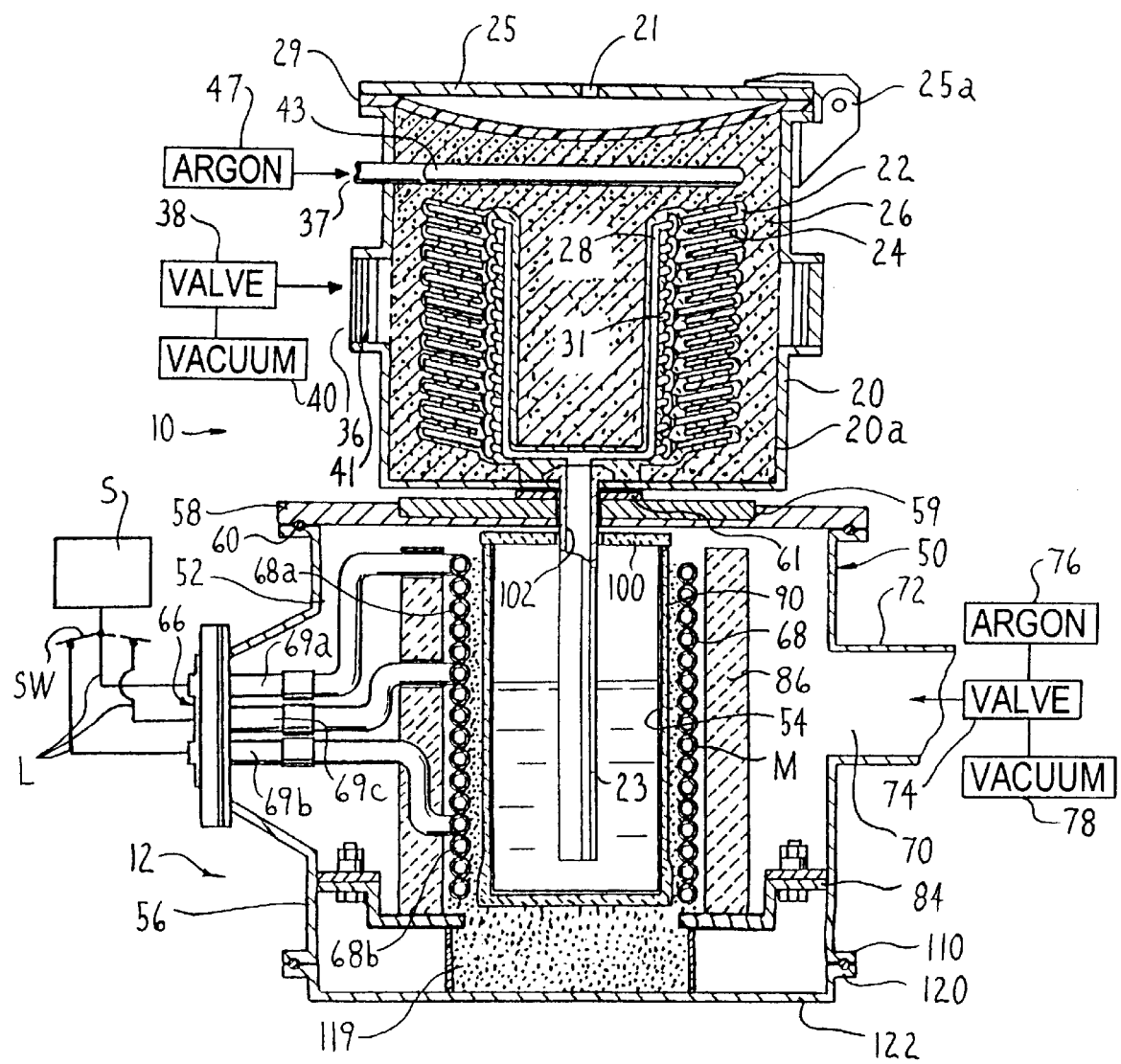
FIG. 2 is similar to FIG. 1 with the fill pipe immersed in the reactive melt.

Referring to FIGS. 1–2, apparatus for practicing an embodiment of the present invention is illustrated as including a mold section 10 and a melting section 12 with the mold section 10 disposed above the melting section 12 for countergravity casting of the reactive melt upwardly into the mold section. A mold container 20 is movable relative to the melting section 12 by a hydraulic actuated arm (not shown) as illustrated in U.S. Pat. No. 5,042,561, the teachings of which are incorporated herein to this end.

The mold section 10 includes a steel container 20 having a cylindrical chamber 20a in which an investment mold 22 having a plurality of mold cavities 24 is disposed in a mass 26 of low reactivity particulates. The mold 22 rests on an elongated, refractory (e.g. carbon) fill pipe 23 depending therefrom outside the container 20. The fill pipe 23 is joined to the bottom of the mold 22 and extends sealingly through a bottom opening in the container 20 as shown, for example, in aforementioned U.S. Pat. No. 5,042,561. A mold sprue 28 is communicated to the fill pipe 23 and to the mold cavities 24 via lateral ingates 31. The investment mold 22 is formed by the well known lost wax process described in U.S Pat. No. 5,299,619, the teachings of which are incorporated herein to this end.

The mold container 20 includes an openable/closeable lid 25 connected to the container via a hinge 25a. The lid carries a sheet rubber gasket 29 communicated to ambient atmosphere by vent opening 21.

The mold is embedded in particulate mass 26 selected to exhibit low reactivity to the particular reactive alloy being melted and cast into the mold 22 so that in the event of any melt leakage from the mold 22, the melt will be confined in a manner without harmful reaction in the mass 26. Suitable particulates for a representative TiAl melt comprise mullite or zircona grain from −20 to +50 mesh size. The particulates can be selected from other materials as desired in dependence on the reactive alloy to be melted.

The rubber gasket 29 compacts the particulate mass 26 about the mold 22 when a relative vacuum is drawn in the container 20 so that the mold 22 is exteriorly supported during casting as it is filled with molten alloy.

The mold container 20 includes a peripherally extending chamber 36 communicated via a conventional on/off valve 38 to a source 40 of vacuum, such as a vacuum pump. The chamber 36 is screened by a perforated screen 41 selected to be impermeable to the particulates of mass 26 so as to confine them within the container 20. The mold container 20 also includes an inlet conduit 37 for admitting argon or other inert gas from a suitably screened distribution conduit 43 to the container from a suitable inert gas source 47. The mold section 10 can be of the type described and shown in detail in aforementioned U.S. Pat. No. 5,299,619.

The melting section 12 includes a metal (e.g. steel) melting enclosure 50 forming a melting chamber 52 about a refractory melting vessel or crucible 54. The melting enclosure 50 includes a side wall 56 and a removable top 58 sealed to the side wall via a sealing gasket 60. A sliding cover 61 of the type set forth in aforementioned U.S. Pat. No. 5,042,561 is disposed on a fixed cover 59 of the top 58 and is slidable to receive fill pipe 23 for the purposes set forth in the patent. The fixed cover 59 includes an opening 59a for the mold fill pipe 23. The sliding cover 61 includes a opening 61a for receiving fill pipe 23 when openings 59a, 61a are aligned to countergravity cast the melt from the vessel 54 into the mold 22.

Pursuant to an apparatus embodiment of the invention, a hollow water-cooled induction coil 68 is provided about the melting vessel 54. The induction coil 68 includes a selectively energizable segment 68a encompassing the upper region of the melting vessel 54 and a lower segment 68b integral with the first upper segment 68a and encompassing a lower region of the melting vessel. Preferably, the upper segment 68a encompasses about ⅓ of melting vessel 54; i.e. the uppermost ⅓ region of the melting vessel. The segment 68b encompasses much of the remaining ⅔ region of melting vessel.

Alternately, the invention can be practiced using a separate upper induction coil corresponding to hollow water cooled coil segment 68a and a separate hollow water cooled induction coil corresponding to lower coil segment 68b. Each of the upper coil and separate lower coil would have two electrical leads corresponding to leads L to the power source S so that the upper coil could be energized selectively for preheating charge component C2 and both the upper and lower coils could be energized to melt the charge components C1, C2 as described below.

The side wall 56 includes a sealed entry port 66 for passage of electrical power supply lead wires L connecting couplings 69a, 69b, 69c to electrical power source S via switch SW. The power source can comprise a conventional solid state frequency converter, although the invention is not limited to any particular power source. Electrical couplings 69a, 69c are connected to opposite ends of the upper coil segment 68a to provide means for electrically energizing the upper segment 68a, while couplings 69a, 69b are connected to opposite ends of the upper and lower segments 68a, 68b to provide means for electrically energizing the entire coil 68; i.e. both upper and lower segments 68a, 68b. A switch SW associated with the power source S is connected as shown in FIGS. 1 and 2 so that the electrical couplings 69a and 69c can be energized by the power source S to selectively energize the upper coil segment 68a and also so that electrical couplings 69a and 69b can be energized by the power source S to energize the entire coil 68. Electrical coupling 69b is connected to the coil 68 above its bottom turns so that the bottom turns can provide structural support of the crucible and keep power leads from metal support flanges 84, 84b.

The side wall 56 also includes a port 70 communicated via a conduit 72 and valve 74 to a source 76 of argon or other inert gas and, alternately, to a vacuum source (e.g. vacuum pump) 78.

The side wall 56 further includes an annular shoulder or flange 84 on which multiple coil supports 86 are circumferentially spaced and sit to support the induction coil 68. The flange includes an outer annular shoulder or flange 84a fastened to inner annular shoulder or flange 84b on which coil supports are disposed to support the induction coil 68. A mass 119 of low reactivity particulates, such as 100 mesh zirconia powder, extends upwardly between the coil 68 and the melting vessel 54 so as to confine any melt that might leak or otherwise escape from the vessel 54 within the low reactivity particulates.

The melting vessel or crucible 54 comprises a cylindrical tubular ceramic shell 90 having bottom 90a, which may be integral with the tubular crucible section or a separate component bonded to the tubular crucible section. For casting titanium based melts, the crucible 54 comprises zirconia faced mullite ceramic.

For casting titanium based melts, the mold 22 comprises an inner zirconia or yttria facecoat and zirconia or alumina outer backup layers forming the body of the mold (e.g. see U.S. Pat. No. 4,740,246). The total mold wall thickness can be from 0.1 to 0.3 inch. The inner facecoat is selected to exhibit at most, only minor reaction with the titanium based melt cast therein so as to minimize contamination of the melt. A preferred mold facecoat for casting titanium based melts is applied to a fugitive mold pattern as a slurry comprising zirconium acetate liquid and zirconia flour, dried, and stuccoed with fused alumina (mesh size 80). One facecoat layer typically is applied. Preferably, backup layers for use with this facecoat are applied as a slurry comprising ethyl silicate liquid and tabular alumina, dried, and stuccoed with fused alumina (mesh size 36).

The open upper end of the melting vessel 54 may be partially closed by a closure plate 100 made of fibrous alumnia. The plate 100 includes central opening 102 through which the fill pipe 23 can be extended as shown in FIG. 2.

The lower closed end of the melting vessel 54 may include an outer shoulder or flange 110 that sealingly engages a similar shoulder or flange 120, which supports access port cover or closure 122.

For purposes of further illustrating a method embodiment of the invention to melt a Ti-6Al-4V alloy, a lower (underlying) solid charge component C1 of elemental titanium solid pieces (shown as slivers) and elemental vanadium solid pieces (shown as solid black chunks) interspersed together are positioned as the solid charge component (comprising about ⅔ of the total charge height in the melting vessel) in the lower region of the melting vessel 54 as illustrated, for example, in FIG. 1. The lower charge component C1 itself can be stratified or layered to include elemental titanium pieces proximate the bottom of the melting vessel 54 to comprise about one-half of the charge component C1 and a mixture of elemental titanium solid pieces and dispersed elemental vanadium solid pieces positioned to overlie the lower titanium pieces to comprise the remaining one-half of the charge component C1. The titanium pieces and vanadium pieces can be mixed together prior to introduction to the melting vessel 54 or can be mixed as or after they are introduced to the melting vessel. Alternately, prealloyed titanium-vanadium alloy pieces can be introduced to the ⅔ of the melting vessel where charge C1 resides. The titanium and vanadium pieces have respective melting points of 3035 degrees F. and 3450 degrees F., thereby constituting the higher melting point components of the total charge to be melted as compared, for example, to the remaining aluminum charge component having a melting point of 1220 degrees F.

In addition to or in lieu of vanadium, the titanium pieces may be interspersed with pieces of other metals such as molybdenum, chromium, niobium, silicon and others, which are present in some titanium alloys. Niobium typically is present in the form of a master alloy of, for example, niobium and aluminum as a result of difficulty in melting niobium due to its very high melting point. These other metals (e.g. molybdenum, chromium, niobium, silicon and others) typically would be dispersed with titanium pieces in a stratified or layered charge component C1 where elemental titanium pieces are placed proximate the bottom of the melting vessel to comprise about one-half of the charge component C1 and a mixture of elemental titanium solid pieces and pieces of these other metals are positioned over the lower titanium pieces to comprise the remaining one-half of the charge component C1. Although a predominant amount of the other metal pieces are dispersed with the titanium pieces in the stratified charge component C1 as described, some minor amount of the other metal pieces may be dispersed in the upper charge component C2 as the melting vessel 54 is charged.

After the aforementioned lower solid charge component C1 comprising titanium interspersed with some vanadium or other metals as described above is introduced into the melting vessel, the lower melting point upper charge component C2 comprising solid aluminum pieces (shown as round shot or particles) and titanium pieces are introduced into the top ⅓ of melting vessel 54 in upper region of the melting vessel so as to overlie the higher melting point solid charge component C1 (e.g. titanium and vanadium pieces). The aluminum pieces of charge component C2 may be charged with titanium pieces to disperse the aluminum pieces for preheating and improve reactivity of melted aluminum with the titanium pieces present.

The charge component C1 may include aluminum interpersed with a lower melting point metal (e.g. tin) used in some titanium alloys (e.g. Ti-5Al-2.5 Sn alloy).

The solid titanium pieces can comprise titanium scrap sheet, briquettes, niblets or other shapes. The titanium scrap sheets are typically 1 inch by 1 inch by 1/16 inch in size and obtained from Chemalloy Co. The briquettes are made of titanium sponge to sizes approximately 1 inch by 1 inch by 3 inches. The titanium charge component is added in an amount to provide the desired Ti weight % in the alloy melt.

The vanadium source can comprise vanadium or vanadium-aluminum alloy shot, scrap sheet, or other shapes. For example, vanadium-aluminum alloy typically is provided in the form of −8 to +50 mesh grains. The vanadium charge component is added in an amount to provide the desired V weight % in the alloy melt.

The solid aluminum pieces can comprise aluminum scrap sheet, shot, or other shapes. For example, aluminum typically is provided in the form of 1/4 inch diameter shot. The aluminum charge component is added in an amount to provide the desired Al weight % in the alloy melt.

For charging, the melting vessel 54 is assembled and supported on cover 122. The melting vessel 54 with the plate 102 removed is charged manually with the solid charge components C1, C2 as described above. The charged melting vessel 54 is placed within the induction coil 68 as shown in FIG. 2 with the cover or closure 122 sealed against enclosure 50 and with removable top 58 removed from the enclosure 50. The particulates 119 (e.g. zirconia grain) then are placed about the melting vessel 54 as shown in FIG. 2 through open enclosure 50. After the particulates 119 have been added and plate 102 repositioned on the melting vessel 54, the top 58 is sealed back on enclosure 50.

At the beginning of the melting/casting cycle for Ti based melt, the melting chamber 52 is first evacuated to less than 0.2 torr (200 microns) and then is backfilled with argon to slightly above atmospheric pressure (controlled to as much as 1 torr pressure) via the port 70.

Then, in accordance with an embodiment of the invention, the coil segment 68a (or separate upper coil) is selectively energized via electrical leads L by coupling 69a, 69c and the power source S to selectively inductively preheat the upper charge component C2 (e.g. mostly aluminum and titanium pieces) in the melting vessel 54 to an increased temperature above the temperature of the first charge component C1. Typically, the upper charge component C2 is selectively induction preheated to an increased temperature determined by the alloy being melted and cast. If multiple charge components are present in the upper melting charge component C2, all components are heated and/or melted in accordance with their physical properties (e.g. melting points). The selective induction preheating of the upper charge component C2 increases the temperature thereof and thereby increases the resistivity of the charge component C2. The higher melting point charge component C1 at the lower region of the melting vessel 54 is only minimally heated by energization of coil segment 68a so that its temperature remains near ambient temperature in the bottom of the melting vessel 54.

For purposes of illustration only, a charge component C2 comprising 1.7 pounds of aluminum and 7.3 pounds of titanium can be selectively induction preheated at a power level of 180 to 200 kilowatts by energizing coil segment 68a for a time of 7 to 7.5 minutes. The temperature of the upper charge component C2 thereby is raised to about 1500 to about 1750 degrees F., which is above the melting point of aluminum of 1220 degrees F. and below the melting point of titanium of 3035 degrees F.

After selective induction preheating of the second charge component C2, both the preheated second metal charge component C2 at the upper region of the melting vessel 54 and the first charge component C1 at the lower region of the melting vessel are induction heated and melted by energizing the entire induction coil 68 including segments 68a, 68b (or separate upper/lower coils) via electrical leads L by coupling 69a, 69b at a much higher power level. Since the upper charge component C2 exhibits a higher resistivity as a result of being selectively induction preheated to the increased (superambient) temperature and thus generates more heat upon induction heating at the higher power input, the upper charge component C2 (including mostly the aluminum and titanium pieces) thus melts first and flows toward the bottom of the melting vessel 54. As top-to-bottom melting of the charge components C2, C1 occurs, the molten alloy thereby formed is substantially held away from the side walls of the vessel 54 by the high induction power level so as to reduce adverse reaction between the molten alloy and the vessel refractory material. Moreover, the bottom center of the higher melting point charge component C1 is the last region of the charge to melt and reduces adverse reaction of the molten alloy with the refractory material at the bottom of the vessel 54.

For purposes of illustration only, a lower charge component C1 comprising 17.7 pounds of titanium and 1.7 pounds of vandium and upper charge component C2 comprising 1.7 pounds of aluminum and 7.3 pounds of titanium can be induction heated and melted at a power level of 220 to 300 kilowatts by energizing both coil segments 68a, 68b via couplings 69a, 69b for a time of 130 to 220 seconds. The high induction power level is effective to substantially hold the molten TiAl alloy thereby formed away from the side walls of the melting vessel 54 as top-to-bottom melting of the charge components proceeds so as to reduce adverse reaction between the molten alloy and the vessel refractory material.

As soon as the melt reaches the desired casting (superheat) temperature (e.g. about 3100 degrees F. after only about 3 minutes for a Ti-6Al-4V melt), the container 20 already filled with an inert gas, such as argon, through inlet 37 is lowered to insert the fill pipe 23 through the port 59a and also port 102 into the melt M in the vessel 54, FIG. 2. The container 20 is moved by the aforementioned hydraulically actuated arm (not shown). Before or upon immersion of the fill pipe 23 in the melt, a vacuum is drawn in the container 20 via chamber 36. A vacuum thereby is applied to the mold 22 compared to atmospheric argon gas pressure in the melting chamber 52 so as to establish a negative pressure differential between the mold cavities 24 and the melt in the vessel 54 sufficient to draw the melt upwardly through the fill pipe 23 into the mold 22.

The melt-filled mold 22 (just removed from the melting chamber 52) is left in its container 20 and argon flow is provided through inlet 37 so that the melt can solidify and/or cool under argon gas to a lower temperature of, for example only, 800 degrees F. before the mold 22 is removed from the container 20. The following Examples are offered for purposes of further illustrating, and not limiting, the invention.

EXAMPLE 1 melting of TiAl melt:

A crucible refractory lining material comprising zirconia faced mullite was used. The charge was melted in an argon atmosphere. The lower charge component C1 comprised of 27 pounds of Ti in niblet form (nibled flake shaped pieces) and the upper charge component C2 comprised 15 pounds of Al in shot form mixed with some titanium niblets. The inital power input to an upper induction coil 68a to heat charge component C2 was 190 kilowatts applied for 7 minutes. Then, full power input to upper and lower induction coils 68a, 68b was applied at 200 kilowatts for 100 seconds to heat and melt charge components C1 and C2 to achieve melt temperature of about 2900 degrees F. The total time to melt C1 and C2 was 520 seconds. The melt was countergravity cast at vacuum of 18 inches Hg in mold container into 28 mold cavities in mold having zirconia facecoat with mold embedded in mullite particulates and using a steel fill tube.

EXAMPLE 2 melting of Ti-6Al-4V melt:

A crucible refractory lining material of zirconia faced mullite was used. The charge was melted in an argon atmosphere. The lower charge component C1 comprised 25 pounds of Ti in niblet form and 1.1 pounds of vanadium in shot form. The upper charge component C2 comprised 1.7 pounds of Al in shot form mixed with some titanium niblets. The inital power input to an upper induction coil 68a to heat Al charge component was 190 kilowatts for 7.5 minutes. Then, full power input to upper and lower induction coils 68a, 68b was applied at 260 kilowatts for 172 seconds to heat and melt charges C1 and C2 to achieve melt temperature of about 3100 degrees F. The total time to melt charges C1 and C2 was 622 seconds. The melt was countergravity cast at vacuum of 29 inches Hg in mold container into 20 mold cavities in mold having zirconia facecoat with mold embedded in mullite particulates and using a steel fill pipe.

Although the invention has been shown and described with respect to certain embodiments thereof, it should be understood by those skilled in the art that other various changes, modifications, and omissions in the form and detail thereof may be made therein without departing from the spirit and scope of the invention as set forth in the appended claims.

We claim:

1. A method of melting a reactive metallic material comprising at least a first metal having a first melting point and a second metal having melting point lower than said first melting point to form a molten alloy, comprising:

positioning a first charge component in solid form and comprising said first metal in a refractory melting vessel beneath a second charge component in solid form and comprising at least in part said second metal in the said vessel, selectively inductively heating said second charge component in said vessel to increase its temperature above that of said first charge component, and inductively heating both said preheated second charge component and said first charge component to produce melting of said preheated second charge component followed by melting of said first charge component to achieve melting from top to bottom in said vessel.

2. The method of claim 1 wherein including interspersing in said first charge component a third metal having a higher melting point than that of said second metal.

3. The method of claim 2 wherein said first charge component comprises pieces of said first metal disposed proximate a bottom of said vessel and a mixture of said first metal and said a third metal thereabove.

4. The method of claim 1 including interspersing in said second charge component a third metal having a higher or lower melting point than that of said second metal.

5. The method of claim 1 including initially energizing induction coil means encompassing said second charge component to heat it.

6. The method of claim 5 including energizing induction coil means encompassing both the first and second charge components to melt them.

7. The method of claim 1 wherein said high power input is effective to substantially hold said molten alloy away from a side wall of said vessel.

8. The method of claim 1 wherein said first metal is selected from the group consisting of titanium and zirconium.

9. The method of claim 8 wherein said molten alloy is cast from the vessel into a mold.

10. A method of melting a titanium base alloy comprising aluminum and another metal having a higher melting point than that of aluminum to form a molten alloy, comprising:

positioning a first charge component in solid form and comprising titanium and said another metal in a refractory melting vessel beneath a second charge component in solid form and comprising at least in part aluminum in the said vessel, selectively inductively heating said second charge component in said vessel to increase its temperature above that of said first charge component, and inductively heating both said preheated second charge component and said first charge component to produce melting of said preheated second charge component followed by melting of said first charge component to achieve melting from top to bottom in said vessel.

11. The method of claim 10 including interspersing said titanium and said another metal as said first charge component.

12. The method of claim 10 wherein said another metal is selected from the group consisting of vanadium, molybdenum, chromium, niobium, and silicon.

13. The method of claim 10 including interspersing said aluminum with another lower or higher melting point metal as said second charge component.

14. The method of claim 13 wherein the another lower melting point metal comprises tin.

15. A method of melting a titanium base alloy comprising aluminum and another metal having a lower melting point than that of aluminum to form a molten alloy, comprising:

positioning a first charge component in solid form and comprising titanium in a refractory melting vessel beneath a second charge component in solid form and comprising at least in part aluminum and said another metal in the said vessel, selectively inductively heating said second charge component in said vessel to increase its temperature above that of said first charge component, and inductively heating both said preheated second charge component and said first charge component to produce melting of said preheated second charge component followed by melting of said first charge component to achieve melting from top to bottom in said vessel.

16. The method of claim 15 including interspersing said titanium and a metal having higher melting point than that of aluminum as said first charge component.

17. The method of claim 16 wherein said metal is selected from the group consisting of vanadium, molybdenum, chromium, niobium, and silicon.

18. The method of claim 16 wherein said another metal comprises tin.

* * * * *

UNITED STATES PATENT AND TRADEMARK OFFICE
CERTIFICATE OF CORRECTION

PATENT NO  :   6,004,368

DATED      :   December 21, 1999

INVENTOR(S):   George D. CHANDLEY et al.

It is certified that error appears in the above-identified patent and that said Letters Patent is hereby corrected as shown below:

Col. 9,  Line 43:  After "having" insert ---second---.

Line 49:  Delete "the";

Col. 10, Line 49:  Delete "the".

Signed and Sealed this

Fifth Day of December, 2000

Attest:

Attesting Officer

Q. TODD DICKINSON

Director of Patents and Trademarks